E. McCOY.
LOCOMOTIVE LUBRICATOR.
APPLICATION FILED APR. 24, 1914.

1,136,689.

Patented Apr. 20, 1915.

WITNESSES:
W. K. Ford
James O. Barry

INVENTOR
Elijah McCoy.

BY
Whittemore Hulbert & Whittemore
ATTORNEYS

UNITED STATES PATENT OFFICE.

ELIJAH McCOY, OF DETROIT, MICHIGAN, ASSIGNOR TO ALEXANDER H. FUSS, OF DETROIT, MICHIGAN.

LOCOMOTIVE-LUBRICATOR.

1,136,689. Specification of Letters Patent. Patented Apr. 20, 1915.

Application filed April 24, 1914. Serial No. 834,097.

*To all whom it may concern:*

Be it known that I, ELIJAH McCoy, a citizen of the United States of America, residing at Detroit, in the county of Wayne and State of Michigan, have invented certain new and useful Improvements in Locomotive-Lubricators, of which the following is a specification, reference being had therein to the accompanying drawings.

The invention relates to locomotive lubricators and it is the particular object of the invention to provide means for the introduction of graphite or other suspended solid lubricant without danger of clogging.

Figure 2:
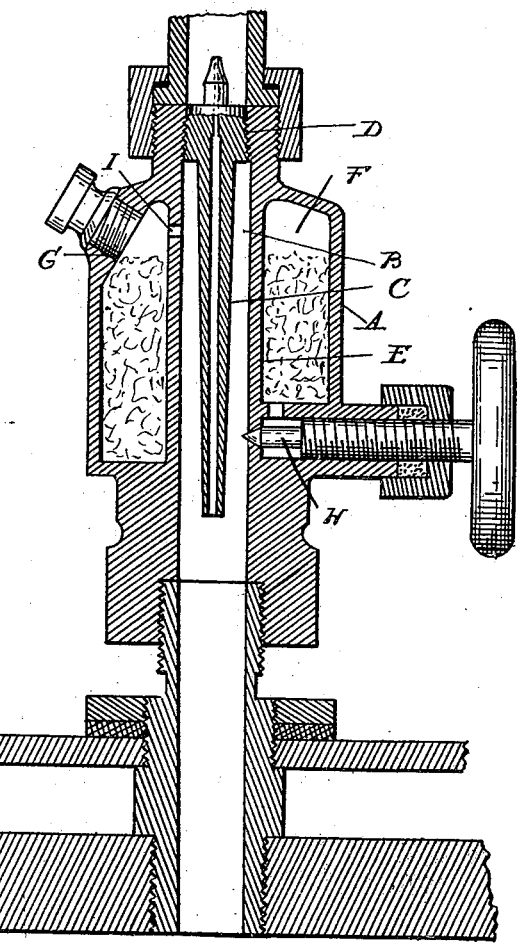
Figure 1:
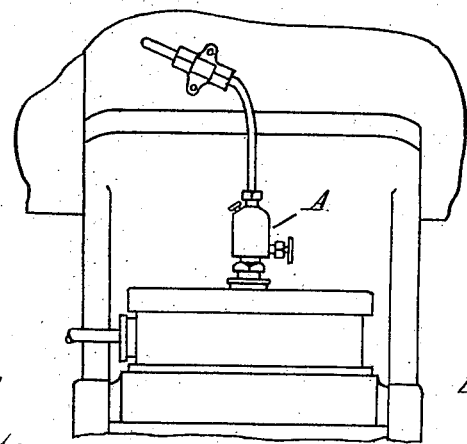

In the drawings: Figure 1 is an elevation of my improved lubricator, showing it as applied to a locomotive; and Fig. 2 is a longitudinal section thereof.

In the present state of the art, locomotive lubricators are usually provided with a restricted passage or choke-plug, which is arranged adjacent to the steam chest at the lower end of the oil conduit. This choke-plug is usually a separate fitting which has a screw threaded engagement with the nipple entering the steam chest and a union coupling with the oil conduit. This is adapted for the feeding of a free-flowing oil, but a heavy lubricant and particularly one containing a suspended solid matter, such as graphite, is liable to obstruct the choke-plug so as to render the device inoperative.

With my improved construction, means is provided for feeding the heavy lubricant without danger of obstructing this choke-plug, this consisting essentially of a lubricant cup associated with a choke-plug, but so as not to clog the restricted passage.

In detail, A is a casing constituting the lubricant cup and which is preferably of such dimensions as to be insertible between the threaded nipple and union of the oil conduit, in place of the usual choke-plug fitting. This casing is provided with a central passage B in which is arranged a choke-plug C preferably in the form of a tapering nozzle having a threaded portion D engaging a corresponding threaded aperture in the casing. Surrounding the passage B is a tubular wall E which separates said passage from an annular chamber F. This chamber receives the graphite lubricant which may be inserted through a plug aperture G, and the discharge of the lubricant is controlled by a needle valve H arranged at one side of the casing. There is also provided a small passage I through the tubular wall E near the upper end thereof, which permits the pulsating steam pressure within the conduit D to be communicated to the space above the lubricant. Thus in operation each pulsation or periodic rise in steam pressure will cause the feeding of some of the lubricant through the passage controlled by the valve H, and in to the central passage B, but this lubricant does not in any way interfere with the restricted choke passage C.

The device constructed as described may be used to replace any standard choke-plug fitting and will provide a means for combining with the oil lubrication that of the heavier lubricant.

What I claim as my invention is:—

1. In a locomotive lubricator, the combination with a choke-plug fitting, of a lubricant receptacle surrounding the same and communicating therewith, said communication comprising a steam passage above the lubricant and a discharge passage for the lubricant, the latter being out of the direct path of the restricted choke passage.

2. In a locomotive lubricator, a casing having a central passage and a surrounding annular chamber, the latter constituting the lubricant receptacle, a choke-plug arranged with the central passage, a valve-controlled passage for the lubricant from said annular chamber to said central passage at one side of said choke-plug, and a pressure-equalizing passage between said annular chamber and central passage above the level of the lubricant.

3. In a locomotive lubricator, a casing containing a central passage and a surrounding annular chamber having a pressure-equalizing port at the upper end and a valve-controlled discharge port connection at the lower end, a choke-plug within said central passage having a depending nozzle extending below the point of entrance of said discharge passage.

4. In a locomotive lubricator, a fitting adapted for coupling between the oil conduit and steam chest and having a central passage and a surrounding annular chamber, a choke-plug having a depending nozzle within said central passage, a pressure-equalizing port between said central passage and annular chamber at the upper end of the latter, and a valve-controlled discharge port between the lower end of said annular chamber and central passage.

In testimony whereof I affix my signature in presence of two witnesses.

ELIJAH McCOY.

Witnesses:
JAMES P. BARRY,
PHYLLIS COBURN.

Copies of this patent may be obtained for five cents each, by addressing the "Commissioner of Patents, Washington, D. C."